United States Patent [19]
Ullmann et al.

[11] 3,806,788
[45] Apr. 23, 1974

[54] DRIVE APPARATUS FOR MACHINE TOOL FEED MOTORS

[75] Inventors: Werner Ullmann, Locarno; Laszlo Rabian, Locarno-Monti; Marco Saglini, Locarno, all of Switzerland

[73] Assignee: A. G. fur Industrielle Elektronik Agie Losone bei Locarno, Losone, Switzerland

[22] Filed: Aug. 9, 1972

[21] Appl. No.: 278,985

[30] Foreign Application Priority Data
Aug. 13, 1971 Switzerland.................... 11945/71
Apr. 25, 1972 Switzerland.................... 6106/72

[52] U.S. Cl. ............................................. 318/601
[51] Int. Cl. .......................................... G05b 19/28
[58] Field of Search ........................... 318/600–602

[56] References Cited
UNITED STATES PATENTS
3,573,589   4/1971   Berry .................................. 318/601
3,668,500   6/1972   Kosem ................................ 318/601

Primary Examiner—Bernard A. Gilheany
Assistant Examiner—W. E. Duncanson, Jr.
Attorney, Agent, or Firm—Flynn & Frishauf

[57] ABSTRACT

Reversible d. c. motors of machine tool feed mechanisms are operated stepwise in either direction by logic circuits utilizing a storage register in which feedback pulses generated by the movement of the tool or workpiece are subtracted from command pulses. Whenever the content of the storage register returns to zero a brake pulse is provided to the motor to counteract the inertia of the motor and machine carriage.

19 Claims, 3 Drawing Figures

DRIVE APPARATUS FOR MACHINE TOOL FEED MOTORS

The present invention relates to apparatus for driving feed motors for machine tools and more particularly for operating feed motors controllable by output signals of a numerical control system. Feed motors of machine tool equipment are used to move one or more tools or work pieces or both tools and work pieces, in the desired direction during machining operation.

Machine tools that are digitally controlled by a numerical program utilize feed motors that actuate the tool or work piece stepwise in the desired direction. A chuck for the tool and the table or carriage for the workpiece are provided with a feed motor for movement in each coordinate direction. In this manner the resultant stepwise motion may be rectilinear, rotational or a combination of both movements. The desired machining of the workpiece is carried out in its relative movement between tool and workpiece. The machining can be either by cutting away (for example, milling, turning, planing or grinding) or by electroerosion (spark machining or electro-chemical attack.) These drive motors are constructed as stepping motors and are advanced stepwise by an electronic control system. Such motors would provide ideal feed drivers if they were not limited in their stepping rate per second, the number of steps possible per revolution and in their torque. In the case of precision machine tools, particularly electro-erosion machines, displacement accuracy to one micron and less and feed velocities from 0.1 mm/minute to 1 m/minute are desired. For quick motion operation drive velocities up to 6 m/minute are necessary. If one step of the stepping motor corresponds to one micron of displacement and a quick motion of 6 m/minute must be achieved, the stepping motor would have to make $10^5$ steps per second. The best stepping motors, which are also costly to produce, cannot produce this stepping rate. For example, $1.6 \times 10^4$ steps per second are feasible.

Precision carriages for a tool chuck and for the work table are almost without exception driven by rotary ball screw drives. To avoid additional errors and greater expense it would be desirable to couple the drive motor directly to the lead screw spindle. Rotary ball screw drives, however, can not be produced with a pitch as small as desired. The smallest pitch that might still be practical is of the order of magnitude of 4 mm per revolution. When the motor operates at one micron per step it would have to make 4,000 steps per revolution Motors with so high a step count per revolution are at present unknown. Known stepping motors make, for example, only 480 steps per revolution.

In the driving of machine tool or work carriages torque values of the order 1 meter-kilo-ponds (mkp). Such amounts of torque can be produced by stepping motors only operating at a very low velocity. Stepping motors of small dimensions do have a somewhat higher stepping velocity, but they can be loaded with only a very small torque. In order to increase the available torque much more expensive hydraulic drives are used. With a complicated and expensive installation of that sort the maximum torque for the feed motor was found to be only 1.5 mkp with a maximum possible stepping rate of 16,000 steps per second.

Known stepping motors, accordingly, have undesirable limitations in stepping rate, step count per revolution, and in torque. This means that the precision and rapidity of machining a work piece are limited even though the electronic control system would allow an extremely high precision and a great machining velocity.

It is an object of the invention to overcome these disadvantages and to do this by the utilization of considerably cheaper feed motors. Another object of the invention is to match the precision of the "electronic side" of a machine tool installation with a comparable precision of the "mechanical side."

A further object of the invention is to provide machining feed of extremely small tolerances comparable to the great capabilities of the "electronic side" of the equipment. The requirements of extremely small dimensional tolerances, of a high stepping rate and high torque are not fulfilled by known types of feed motors because each of these requirements makes the others more difficult to attain. In accordance with the invention it is possible for the first time to fulfill the combination of conditions as imposed on a modern machine tool installation, so that what has been up to now the weakest part of the operation, that is, the "mechanical side" of the feed, can implement the capabilities of a numerical control system.

SUBJECT MATTER OF THE PRESENT INVENTION

Briefly, between the numerical control system and a feed motor a circuit means is provided comprising the following components:

a. a storage register having a first set of inputs connected to the outputs of a numerical control system for receiving information signals to be transmitted for a stepwise operation of the feed motor and a second set of inputs connected to a feedback device for receiving signals representative of the execution of step movements by the feed motor, with arrangements for subtracting the last mentioned signals from those received in numerical control system, and b. logic circuit means in which response to the content of the aforesaid storage register supplies the drive to the feed motor in one or the other direction.

The invention will be described by way of example wihh reference to the accompanying drawings, wherein.

Figure 1:
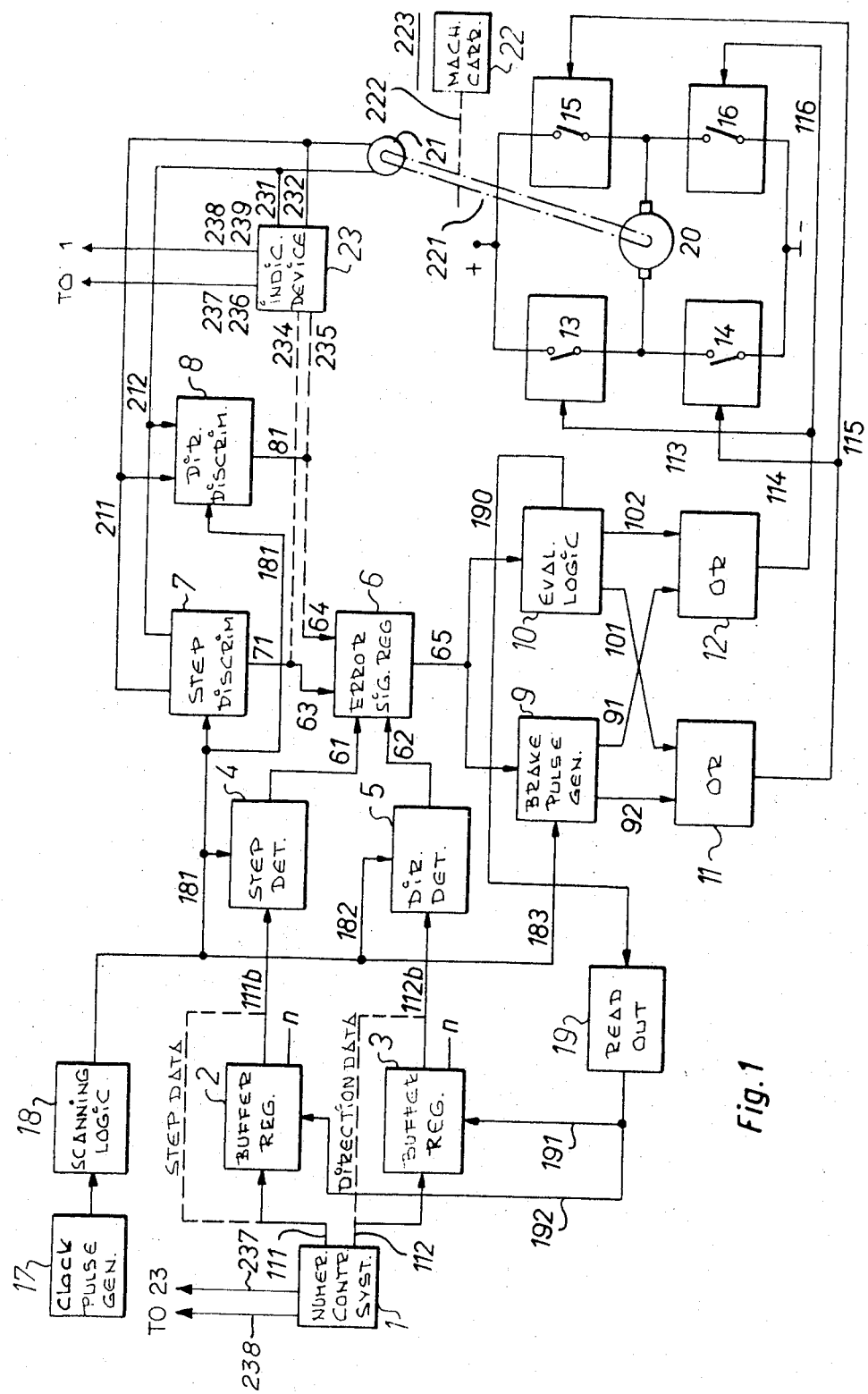
FIG. 1 is a block diagram of a circuit means according to this invention and a feed motor associated therewith.
Figure 2:
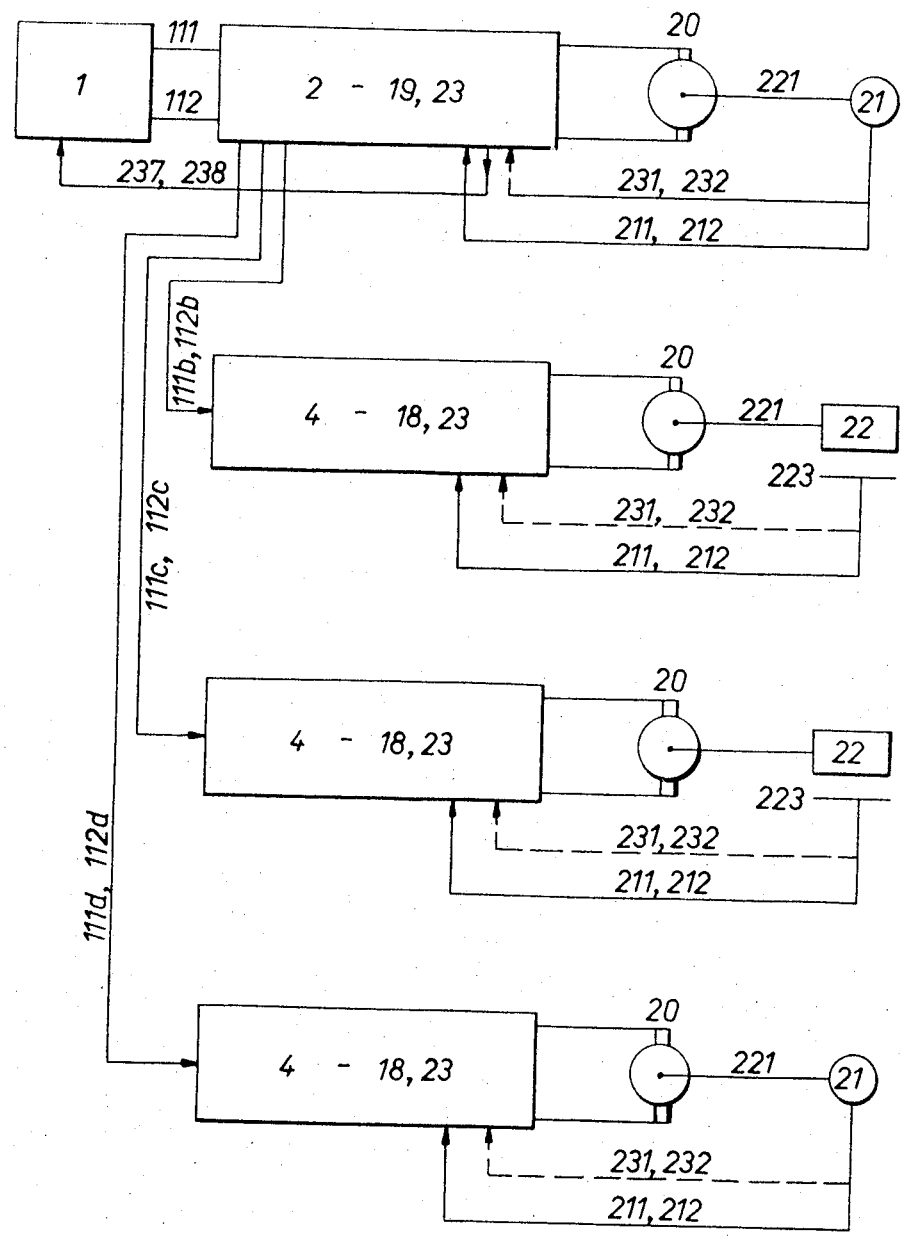
FIG. 2 is a block diagram of an arrangement of a plurality of circuit means according to the present invention, each associated with a feed motor, in which one of the circuit means is operated as a main drive and the others as an auxiliary drive by a single numerical control system.
Figure 3:
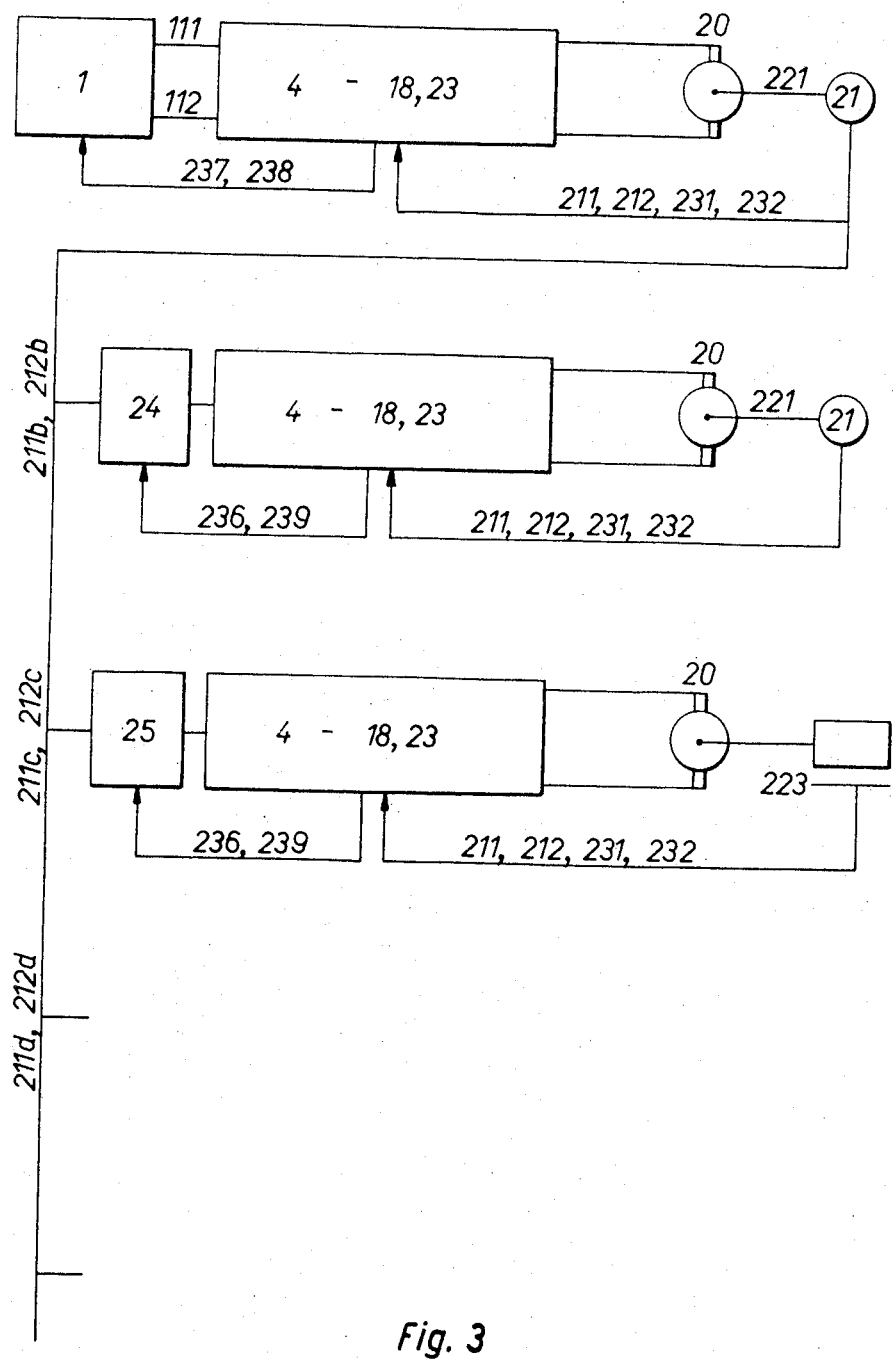
FIG. 3 is a block diagram of an arrangement with a plurality of circuit means according to the invention, each associated with a feed motor, in which one of the circuit means is operated in response to the numerical control system as a lead drive and the other circuit means are operated as supplementary drives in response to the output signals of the feedback device of the lead drive.

In the block diagram constituting FIG. 1 the numerical control system shown as block 1. This is a known type of control system and is in essence a machine control computer consisting basically of a reader, a central processor or calculating means, various storage registers or memories and a clock pulse generator. Its input is a program relating to a particular job in the form of a punched tape, a magnetic tape, a deck of punched cards or other carefully prepared and meticulously checked data which the reader of the system is adapted to read in the proper sequence. There is an internal program in the system which causes the instructions read by the reader to be translated by calculations, if necessary, into control pulses for the feed motors of each dimension in which the machine operates. Such a numerical control system is described, for example, in Swiss Pat. Nos. 476,544 and 513,694. The control system disclosed in the cited patents is used to control electro-erosion machining, that is, machining with a spark discharge or by means of electro-chemical action upon a workpiece. That control system is basically applicable also for conventional machining, such as machining with a cutting tool or with an abrasive wheel. An information carrier such as punched paper tape, for example, supplies date to the numerical control system as necessary for controlling the path of the tool or workpiece or both, these data being processed in the control system so as to provide signals at the two outputs of the system for transmission to a feed motor 20. The control system 1 is so constituted that there are two output terminals for each feed motor. FIG. 1 shows connection paths between the control system 1 and a single feed motor 20. The same kind of connctions apply also for all the feed motors for the machine tool installation in question, as schematically indicated in FIGS. 2 and 3.

The stepping pulses at the output of the numerical control system 1 may be coded according to either of the following methods:

a. Stepping pulses on conductor 111 provide information for operation in one direction of rotation and stepping pulses on conductor 112 provide information for the other rotational direction of feed motor 20; or b. all stepping pulses appear on conductor 111, for example, whereas on the other conductor (112) a coded signal appears which determines direction of feed motor 20.

In the description which follows below case (b) will be assumed, although case (a) is readily applicable for the same purpose. It should be noted that what is stored in register 6 is in effect what is commonly referred to as an "error signal" since, as will presently be pointed out, the command signals are added in and the performance signals are subtracted. Logic circuit 10 evaluates the error signal for operation of feed motor 20 and hence may be referred to as an "evaluation logic circuit."

The stepping pulses on conductor 111 and the direction code signal on conductor 112, which together provide the information for the stepwise movement of feed motor 20, as shown in FIG. 1 may be applied directly to stepping pulse detector 4 and direction detector 5 or indirectly through buffer storage registers 2 and 3 respectively. Buffer storage registers 2 and 3 are used when the information from the numerical control system 1 is furnished in short impulses rather than continuously, so that the feed motor might lose its drive before the completion of its commanded step. This situation can arise, for example, when a plurality of circiut means and feed motors of a single machine tool equipment, as shown in FIG. 2, or a plurality of machine tool equipments, are controlled by a single computer in a concurrent multiplex drive mode. In this form of parallel drive, which from the point of view of the computer is referred to as "time shared operation," the data are read out of buffer storage registers 2 and 3 and supplied to pulse detector 4 and directional detector 5 when the evaluation logic 10 provides a corresponding signal over the transfer logic of read out circuit 19. In FIG. 1 the direct connection between the outputs of control system 1 and pulse detector 4 and directional detector 5, respectively, are shown by dashed lines.

From pulse detector 4 the stepping pulses are supplied to an input 61 of storage register 6, while a directional signal is similarly supplied by directional detector 5 to an input 62 of storage register 6. The information constituted by the stepping pulses and directional data can reach inputs 61 and 62, however, only when, by means of other equipment, it is assured that inputs 63 and 64 of the same storage register 6 are not receiving information. The equipment for assuring that inputs 63 and 64 are not active when information is provided to inputs 61 and 62 comprises clock pulse generator 17 which provides high frequency overall synchronization for the control system by means of scanning logic circuit 18, in such a way as to enable output from pulse detector 4 and directional detector 5 while blocking output from the outputs 71 and 81 of discriminators 7 and 8, and vice-versa. This function is represented in FIG. 1 the connections 181 and 182. It follows also that discriminators 7 and 8 can furnish signals to inputs 63 and 64 of storage register 6 only when the outputs of detectors 4 and 5 are blocked.

Let it now be assumed that pulse detector 4 supplies a stepping pulse to input 61 of storage register 6 and that directional detector 5 supplies to input 62 of the same storage register an indication of positive direction of rotation. This combination of sets the content of storage register 6 at +1. This content is communicated over connection 65 both to the evaluation logic 10 and to brake pulse generator 9. Evaluation logic 10 switches one of the two OR-gate circuits 11 and 12 in response to a positive content (+1) is storage register 6. Let it be assumed that evaluation logic 10 switches OR-gate circuit 11 over conductor 101, which in turn by acting over connections 114 and 115, closes the electronic switches 14 and 15. These two electronic switches bring about the operation of feed motor 20 in one of its two directions. For reasons of simplification, this direction may be called the "positive" direction. Feed motor 20 is of the normal servo motor type, not of the usual stepping motor type. It now runs in the positive direction as long as energizing voltage is provided over closed switches 14 and 15. At this time the other electronic switches 13 and 16 are open. Feed motor 20 turns in the other or "negative" direction of rotation if switches 14 and 15 are opened and switches 13 and 16 are closed.

Let it again be assumed that positive content (+1) in storage register 6 has closed electronic switches 14 and 15 over evaluation logic 10 and OR-gate 11 and that feed motor 20 is now turning in a positive direction. Motor 20 is mechanically connected by lead screw shaft 221 to the rack 222 of the machine carriage 22. It also is coupled to rotational position indicator 21.

Machine carriage 22, to which the tool chuck or the work table may be fixed, is moved in the direction of one coordinate by the rotary motion of feed motor 20. As previously explained in the introduction, an individual feed motor must be provided for each coordinate of motion. Neither the tool chuck itself nor the work holding table are shown in FIG. 1.

Motor 20, turning in the positive direction, rotates position indicator 21, which is connected by the two conductors 211 and 212 respectively, with step discriminator 7 and directional discriminator 8, and further connected over conductors 231 and 232 to the indicating device 23.

The rotational position indicator 21 can be constructed with a rotatable disc having alternating opaque and transparent radial stripes. Each stripe may correspond, for example, to a displacement of one micron. Light sources and photoelectric detectors can then generate electrical signals upon interception of the passage of these stripes. Such electrical signals are furnished over conductors 211 and 212 to discriminators 7 and 8 respectively and also to indicator device 3. The latter will be discussed further below. For the present only the discriminators 7 and 8 will be considered.

Photoelectric detectors associated with the striped disc rotational position indicator 21 are provided at two slightly different positions, so that a particular stripe will generate a signal, for example, to conductor 211 earlier than a corresponding signal is generated and furnished to conductor 212 when the shaft 221 rotates in one direction, and vice versa when the shaft rotates in the opposite direction. The interval between corresponding signals created by the same stripe on conductors 211 and 212 respectively may, for example, be one-fourth of the period of signal alternation caused by the alternation of opaque and transparent stripes passing the photoelectric signal take off. It may be assumed for the present description that when feed motor 20 and rotational indicator 21 turn in what we have called the positive direction, the signals appearing on conductor 211 precede by a quarter period corresponding signals on conductor 212.

In the example here described, upon displacement of machine carriage 22 by one micron and the precisely related movement of indicator 21, the step discriminator 7 received a single pulse over conductor 211, while at the same time directional discriminator 8 determines that a pulse from conductor 211 is received, and then a pulse from 212 arrives before the end of the pulse on 211. This sequence of events causes an output indication from direction discriminator 8 signifying that the direction of rotation is positive. There is obviously a possibility that the signals provided to step discriminator 7 from rotational indicator 21 may be multiplied in the proportion of twice the number of conductors, and in this manner a displacement resolution or dimensional tolerance of less than one micron can result.

In the example here described of rotation of the indicator 21 in a positive direction, the resulting phase shift between the impulses respectively on conductor 211 and 212 may be assumed to cause a negative signal to be stored in directional discriminator 8. A pulse signal is stored in step discriminator 7. Respective outputs 71 and 81 of discriminators 7 and 8 are given access to inputs 63 and 64 of storage register 6 when clock pulse generator 17 and scanning logic circuit 18 provide an unlock signal to the two discriminators. This unlock signal is given only when storage register 6 is holding a stepping pulse provided by its inputs 61 and 62 respectively by detectors 4 and 5. After the storage register 6 receives such a stepping pulse from discriminators 4 and 5, the latter are blocked by a lock signal over connections 181 and 182, so that a signal and directional information respectively from discriminators 7 and 8 can then be furnished to storage register 6 over its input 63 and 64 respectively. The signals so furnished in the case of the example just described is a −1 pulse signal. The − 1 pulse modifies the +1 pulse previously stored in storage register 6 and sets the register content back to zero. As soon as the content of storage register 6 is set back to zero, brake impulse generator 9 and evaluation logic circuit 10 are activated. The function of brake impulse generator 9 is described further below.

The activation of evaluation logic circuit 10 activates OR-gate 11, so that switches 14 and 15 will be opened as a result of electrical commands over conductors 114 and 115 respectively. Feed motor 20 thereupon receives no more current and comes to rest. As a result of the inertia of feed motor 20 and machine carriage 22, however, these components will continue moving further in the original direction. This will be described later more particularly in connection with brake impulse generator 9. For the moment it is sufficient to recognize that the electronic switches 14 and 15 are open and that feed motor 20 receives no current. If in the numerical control system successive commands for the movement of feed motor 20 in the same direction are provided, each individual step of the operation runs as just described, so that in each case feed motor 20 advances by only one step, for example, 1 micron. If feed motor 20 is to be moved in the opposite direction, in principle, the same operational steps are performed but in this case with the opposite sign. This will be explained briefly as follows: the numerical control system 1 furnishes to detectors 4 and 5 information consisting of the appropriate number of stepping pulses and the directional signal. This information is read into storage register 6 over inputs 61 and 62. During the time this read-in input is unlocked by clock pulse generator 17 and scanning logic circuit 18 operating on detector 4 and 5 over conductors 181 and 182, respectively, storage register 6 can, as already described in the previous example, receive one or more stepping pulses. The number that it can receive depends upon its number of bit storage places. To simplify this explanation it will be assumed that storage register 6 receives over its inputs 61 and 62 respectively a single stepping pulse and a negative rotational direction indication, so that it is accordingly loaded with a −1 content. Thereupon its output connection 65 will activate only the evaluation logic circuit 10. Brake impulse generator 9 is activated only in case of a zero content in storage register 6.

The described activation of evaluation logic circuit 10 activates OR-gate 12 over conductor 102 and that gate causes electronic switches 13 and 16 to close by electrical commands over conductors 113 and 116. Electronic switches 14 and 15 are, as previously mentioned, open. Drive motor 20 now turns in the "negative" direction and moves machine carriage 22 in the "negative" displacement sense by means of screw shaft 221 and rack 222. Rotational position indicator 21 now turns in the "negative" direction so that pulses on conductors 211 and 212 have a relative phase shift different from that in preceding example. Consequently in both discriminators 7 and 8 there are now pulse signals with positive potential. The resulting +1 signal produced in storage register 6 over its inputs 63 and 64 sets back to zero its previous −1 content. In consequence there is created an output on conductor 65 which now activates both brake pulse generator 9 and evaluation logic circuit 10. Evaluation logic circuit 10 opens electronic switches 13 and 16 to cut off the current of feed motor 20, operating these switches over conductor 102, OR-gate 12 and conductors 113 and 116. The mode of operation of brake pulse generator 9 is further described below in connection with the inertia of feed motor 20 and machine carriage 22, which causes motor 20 and carriage 22 to continue moving further in the original direction in spite of the interruption of the current.

The indicating device 23 is connected by its inputs 231 and 232 to the conductors 211 and 212 running between the feedback device 21 and discriminators 7 and 8 respectively, with the result that the indicating device responds to and indicates actual position. By means of these visual indications the operator of the equipment can recognize the actual position of the workpiece or tool, as the case may be. Visible indication of actual position can be so adjusted that they are given with reference to a desired starting point within the whole range of movement of the tool or work piece. If the tool or work piece must make a backward movement, then this backward movement can be followed optically on the indicator device 23. At this point it should be mentioned that particularly in the case of electro-erosion machining the work piece must perform a backward movement which has the same path as the normal forward movement during the machining process. Such a backward movement is described in the two cited Swiss Pats. Nos. 476,544 and 513,694. It is sufficient to say in this connection that this backward movement is provided for in the numerical control system 1. The motor 20 receives corresponding signals for the stepwise withdrawal movement just as has been described up to now for the normal advancement movement. Such a rearward movement can in principle be supplied also for conventional or cutting tool machining of work pieces.

Indicator device 23 does not need to be connected to conductors 211 and 212. It can also be readily connected directly by its inputs 234 and 235 to the respective outputs 71 and 81 of the discriminators 7 and 8, or to the second set of inputs 63 and 64 of the error signal storage register 6. Whether the input connections 231 and 232 shown in FIG. 1 or the input connections 234 and 235 there shown are used for the indicating device 23 depends on whether the indicator device 23 consists only of a counter indicator display or whether this device also has additional circuits such as, for example, discriminators functioning in a manner similar to operation of discriminators 7 and 8. Outputs 236, 237, 238 and 239 of indicator device 23 are connected, by conductors partly shown in FIG. 1, to the numerical control system 1. The purpose of this connection with control system 1 is to provide feedback of actual position values into the control system.

Indicator device 23 possesses still another particular property, described further as follows: it has also means for reacting to a particular position of the tool or of the workpiece, or both. When a counter in the indicator device reaches this particular actual position, the operation of control system 1 is then modified by means of outputs 236, 237 and 239. For example, in case of electro-erosion machining, when the electrode has been advanced all the way to some predetermined position in the workpiece, the so-called "deep end shut off" will take place. Finally, indicator device 23 can also be provided with a differentiating means which is adapted to convert the time rate of change of the actual position values for the average displacement velocity of the workpiece or of the tool.

Now referring back to buffer storage registers 2 and 3 which are interposed in conductors 111 and 112 the control system output as previously explained in the beginning, these two buffer storage registers are advantageous in the case in which a plurality of numerically controlled machine tools, i.e., a larger number of feed motors and machine carriages, are controlled by a single computer in a concurrent multiplex drive. The same situation arises when two or more feed motors of a single machine tool are similarly controlled, as described, for example, in Swiss Pat. No. 513,694. Each of the buffer storage registers 2 and 3 possesses a plurality of outputs as indicated on FIG. 1 by conductors 111a, 112a and n, which are described more particularly below in connection with FIG. 2. In such a case information from numerical control system 1 is not furnished continuously to detector 4 and 5 but rather in brief impulses, so that the feed drive cannot directly follow the step pulses. At this point it should be explained that storage register 6 has a sufficiently large number of binary digit storage positions to be able to store a certain amount of intermittently supplied stepping pulses, with directional indication. The occasional overflow of storage register 6 is indicated by known means not shown in the drawing.

In order to keep storage register 6 from having to be inconveniently large, it is designed for a normal accumulation of intermittent information loading. In the case of greater loading, as may occur, for example, in the above-mentioned concurrent multiplex drive of plurality of machine tool equipments, it is desirable to provide the two buffer storage registers 2 and 3 interposed between the conductors 111, 112, 111a, 112a, as shown. The information temporarily stored in buffer storage registers 2 and 3 will then be transferred to detector 4 and 5 only when the read out logic 19 provides a read out signal over conductors 191 and 192. The read out logic is activated by the evaluation logic circuit 10 over conductor 190. Such activation accordingly occurs in such a manner that read out logic 19 is activated only when storage register 6 has a 0 content. In this case the read out logic 19 can appropriately be activated by brake impulse generator 9, which as previously explained operates only on 0 content in storage register 6.

Rotational position indicator 21 has been described in the previous example as having peripheral stripes that are optically scanned to generate electrical signals for each micron of carriage movement. It is also readily possible to provide a linear scale 223 on machine carriage 22, the marks of which will indicate increments of displacement when optically scanned as the machine carriage is shifted, thereby producing electrical signals over conductors 211 and 212 to the respective discriminators 7 and 8 and to the indicator device 23. In such a case there is no need for the rotational position indicator 21. The advantage of optically scanning the linear scale 223 lies in eliminating errors involving the lead screw 221 and the transmission 222. The linear scale 223 can show the true and really linear movement of machine carriage 22 and hence of the tool or workpiece.

In the description of the two examples (positive or negative content of storage register 6, positive or negative direction of rotation of feed motor 20, feedback of position signals and setting back to 0 of the content of storage register 6) it was shown that upon the setting back to 0 of storage register 6 the closed pair of electronic switches 14, 15 or 13, 16 was opened so that the feed motor was left without current. On account of the inertia of this motor and its transmission 221, 222 and that of machine carriage 22, the feed motor moves further in the general direction of rotation in in spite of the absence of current. For the case of a very fine subdivision it was assumed, for example, for a displacement resolution of one micron that a movement revealed by the rotational position indicator 21 or the linear scale 223 would provide one or more pulses over conductors 211 and 212 to discriminators 7 and 8. The latter provide impulses over inputs 63 and 64 into storage register 6 that are there subtracted from the existing content of the register, modifying the voltage signal on conductor 65 and acting through evaluation logic circuit 10, one of the two OR-gates 11 and 12, to close the particular pair of electronic switches which drives the feed motor in the opposite direction until the input of storage register 6 is set back to 0. In this case also, after the storage register content is set back to 0 and the electronic switches are open, the feed motor 20 still runs further in the same direction. It will be seen that in this manner an oscillation of motor 20 between +1 and −1 content of storage register 6 arises. It is to avoid such oscillation that brake pulse generator 9 is provided. This pulse generator is activated over conductor 65 by storage register 6 when the content of storage register 6 is set back to 0. In this case pulse generator 9 provides a brake pulse to the particular pair of electronic switches effective against the momentary direction of rotation of feed motor 20, this being accomplished either over conductor 91 and OR-gate 12 or, as the case may be, over conductor 91 and OR-gate 12 or, as the case may be, over conductor 92 and OR-gate 11. The evaluation logic circuit 10, likewise activated by 0 content of storage register 6 over connection 65, at the same time opens the pair of electronic switches which were previously closed for the just executed feed motion. This also takes place over one or the other of OR-gates 11 and 12. In this manner feed motor 20 receives a so-called brake pulse in the opposite direction of rotation. The brake pulse generated by the brake pulse generator 9 lasts as long as the content of storage register 6, if it goes off 0, is not set back to 0.

In FIG. 2 a plurality of circuit means, one of them designated 2 — 19, 23 and several designated 4 —18, 23, are shown, each of which controls a feed motor 20 controlled stepwise in the desired direction. It may now be assumed that the individual circuit means and their associated feed motors provided for the various coordinates of movement for a single machine tool equipment are controlled by a single numerical control system 1. The first of these circuit means designated 2 — 19, 23, is connected to numerical control system 1 over conductors 111 and 112, in the manner shown in FIG. 1.

The movement of feed motor 20 in the desired direction needs not be further described in this connection. Feed motor 20, by means of shaft 221, operates rotational position indicator 21, which is connected with discriminators 7 and 8 over conductors 211 and 212 respectively and with inputs 231 and 232 of indicator device 23 with conductors identified with these input members. The outputs 237 and 238 of this indicator device are connected by other conductors to numerical control system 1. Whereas detectors 4 and 5 of the first circuit means are connected with buffer storage 2 and 3 over conductors 111a, 112a, respectively, not shown in FIG. 2 (see FIG. 1), detectors 4 and 5 of the other circuit means indicated in FIG. 2 as auxiliary drives with the designation 4 —18, 23 are connected over conductors 111b, 112b, 111c, 112c, 111d, 112s, and so on, to the buffer storage registers 2 and 3 of the first circuit means. In FIG. 1 these connection possibilities are indicated by the symbol n.

In FIG. 2 the feed motors associated with these auxiliary drives actuate for feedback purposes either a linear scale 223 on a machine carriage 22, or else a rotational position indicator 21 on a shaft 221. It may appropriately be assumed that the four feed motors 20 are provided respectively for movement in three linear coordinate directions and about one rotational axis (e.g., in polar coordinates). The actual position measurements of the individual feedback devices 21, 223 are provided, as shown in FIG. 2, to the discriminators 7 and 8 and to the indicator device 23 of the corresponding circuit means. Such a machine tool equipment with four feed motors is described in more detail in the previously cited Swiss Pat. No. 513,694. In such a combination of feed drives the most varied movements can be combined with each other, so that the most complicated contour can be produced on the work pieces. Various contours of the the most elaborate type used in electro-erosion machining can be produced, for example, the kinds described in Swiss Pat. Nos. 342,674 and 378,437 and in the following technical publications:

1. "Neuer funkenerosiver Universalkopf fuer 120 Bearbeitungsoperationen," by V. E. Dumpe, original in Russian, "Stanki i Instrument" 30 — 1958, No. 9, pages 13–15; in English "Machines and Tooling," 1968, No. 9.

2. "Die Elektro-Impuls-Bearbeitung von Metallen," by Levinsson, E. N., and Lev, N. S., page 55, and following, publisher Maschgiz, Moscow and Leningrad, 1961.

3. "Elektrofunken-Einrichtungen," Levinsson, E. N., and Wladimiro, pages 34–38, publisher Maschgiz, Moscow and Leningrad, 1951.

The combination of four feed motors 20 shown in FIG. 2 can of course be used for electro-erosion cutting with wire or tape for an electrode or with an electrode in the form of a sheet or a rotating disk. It should be made clear that all of the information for the movement of the four feed motors 20 is stored on an information carrier in the numerical control system. The buffer storage registers 2 and 3 of the first circuit means serve also the other circuit means, so that the entire group can be controlled from a single numerical control system.

FIG. 3, like FIG. 2, shows a combination several circuit means. As shown in FIG. 3 the control system 1 controls the first circuit means 4 — 18, 23 over conductors 111 and 112. This circuit means here operates as a lead drive. The other supplementary circuit means are controlled by the position signals of the feedback device 21 of the lead drive in such a way that data processors 24 and 25, which may be referred to as calculators or computers, provide the command signals for the feed motors in response to the output signals of the feedback device 21 of the lead drive. For this purpose this particular feedback device 21 is provided with additional output conductors 211b, 211c, 212c, 212d, and so on. This feedback device 21, which for example can be constructed in the form of a rotational position indicator, provides output signals regarding the actual position of the tool or workpiece, or both, and communicates the signals to discriminators 7 and 8 ober conductors 211 and 212 respectively and like-over other conductors to the inputs 231 and 232 of the indicator device 23 of the first circuit means. The outputs 237 and 238 of indicator device are connected back to the numerical control system 1.

The conductors 211b, 212b, 211c, 212c, 211d, and 212d of FIG. 3 are in reality separate conductors from feedback device 21 of the lead drive to the individual calculators 24, 25 and so on. Calculator 24 of one of the supplementary drives, for example, may be a lead screw calculator. In response to the output signal of the rotational position indicator 21 of the lead drive, the lead screw calculator 24 computes the positioning signals for the supplementary drive 4 —18, 23, 20, 221, 21. The feedback device 21 of the supplementary drive, which likewise may be provided in the form of a rotational position indicator, provides its actual position output signals to the discriminators 7 and 8 over conductors 211 and 212 respectively, and also over other conductors to the inputs 231, 232 of indicator device 23 of the supplementary drive. The outputs 236, 239 of the indicator device 23 are fed back to the lead screw calculator 24.

The calculator 25 of the next supplementary drive may be a so-called follow-up calculator. The manner of operation of this supplementary drive 55, 4 — 18, 23, 20, 221, 22, 223 and the corresponding feedback connections between the linear scale feedback device 223 and the discriminators 7 and 8 and indicator device 23 are the same as described in the case of the last mentioned drive.

In the system of FIG. 3 still more supplementary drives can be provided. This is indicated, for example, by conductors 211d and 212d. With the embodiment of the invention shown in FIG. 3, workpieces can be machined to all kinds of contours, such as set forth in the two cited Swiss Pat. Nos. 342,674 and 378,437 and in the above cited technical literature.

Although in the illustrative examples described in connection with FIG. 2 and FIG. 3 several feed motors are provided for a single machine tool equipment, it must also be pointed out in a similar way that several machine tool equipments may be controlled by a single numerical control system 1. For this case one must imagine the drawings of FIGS. 2 and 3 repeatedly drawn to show the complete system.

With the circuit means of the invention it is possible to use relatively cheap feed motors which are not constructed as stepping motors and to obtain with these a feed velocity of 1 million steps per second, a step count of 20,000 steps per revolution and torque values to several mkp. By this means it is possible for the first time to provide rapid motions with feed velocities of 6 m per minute with dimensional resolution and tolerance as small as, for example, 1 micron, while at the same time still obtaining high torque. The feed apparatus according to the invention can, of course, be connected to any desired type of numerical digital control system. With this invention it is also possible to improve the feed mechanisms of existing machine tools in such a way that capabilities numerical control can be more fully realized on the mechanical side of the feed. Feed apparatus according to this invention, furthermore, is suited to replace the known hydraulic feed equipments which were developed some time ago in order to obtain high feed forces with a certain precision. The invention brings a new concept to the development of machine tools which the feed equipment is an important part.

The circuits, components, and logic elements generally described and illustrated in block form are all well known and many are readily available as commercial articles of electronic circuitry. Specific circuits, constructions and details can be found by reference to the appropriate chapters (and further references referred to therein) as indexed, in various publications such as:

"Pulse and Digital Circuits," Millman and Taub; McGraw Hill Book Co., 1956;

"Design of Transistorized Circuits for Digital Computers," A. I. Pressman; John F. Ryder, Publisher, Inc., New York, 1959;

"Principles of Control Systems Engineering," Vincent del Toro, Sydney R. Parker; McGraw Hill Book Co., 1960; and "Electronic Devices and Circuits," Jacob Millman, Christos C. Halkias; McGraw Hill Book Co., 1967.

Although for simplicity the invention has been described with reference to the common practice of applying the feed drives either to the tool or to the work piece, it is to be understood that feed drives may be applied to both tool and workpiece. If this is done by supplying a set of feed drives for each, the operative motion of tool and workpiece is their relative motion, and the numerical control will be programmed accordingly. On the other hand, it is possible for a single feed drive to be mechanically equipped to move the workpiece and the tool in opposite directions, and to produce relative movement in that manner, or for the feed for one coordinate direction to move the tool while the feed for another coordinate moves the workpiece. The choice of the particular mechanical movement for the various feeds depends, of course, upon the kind and scale of the machinging operations to be performed.

We claim:

1. Apparatus for driving a feed motor in a machine tool control system having a numerical control system and a reversible feed motor operable on continuous direct current and adapted to be driven in either direction under numerical control, which apparatus comprises an electric circuit assembly interposed between said numerical control system and said feed motor comprising:

a storage register (6) having a first set of inputs (61, 62) connected to the outputs (111, 112) of said numerical control system (1) for receiving information signals directing movement to be produced by said feed motor (20) and having also a second set of inputs (63, 64) connected to a feedback device (21, 223) for reception of signals representing intervals of movement produced by said feed motor (20);

detector means (4, 5) interposed between the outputs (111, 112) of said numerical control system (1) and said first set of inputs (61, 62) of said storage register (6), which detector means are adapted to provide information signals directing successive elements of movement to be produced by said feed motor (20) to said first set of inputs (61, 62) of said storage register (6) only when said signals from said feedback device (21,223) to said second set of inputs (63, 64) of said storage register (6) are blocked;

means including a connection (237, 238) from said feedback device to said numerical control system independently of said storage register (6) for coordinating the succession of information signals from said numerical control system with a succession of movements produced by said feed motor;

means associated with said storage register (6) for subtracting signals of said feedback device (21, 223) from signals of said numerical control system (1), and logic circuit means (10) adapted to apply the drive to said feed motor (20) in forward or reverse direction in accordance with the content of said storage register (6).

2. Apparatus as defined in claim 1 in which said storage register (6) is connected to activate said logic circuit means (10) when the content of said storage register (6) is other than zero and in which said logic circuit means (10) is adapted to respond to such activation by said storage register (6) by energizing said feed motor (20) in the desired direction.

3. Apparatus as defined in claim 2 in which said logic circuit means (10) operates a pair of electronic switches (13,16; 14, 15) through at least one gate circuit (11, 12) in order to apply drive to said feed motor (20) in a desired direction of rotation, and in which electronic switches are arranged in a bridge connection between an electric current supply and a winding of said feed motor.

4. Apparatus as defined in claim 1 in which a brake pulse means (9) is provided, adapted for activation by said storage device (6), and in which said brake pulse means (9), in the case of a particular content of said storage register, briefly counteracts the rotation of said feed motor.

5. Apparatus as defined in claim 4 in which said brake pulse means (9) is adapted to close briefly a pair of electronic switches (14, 15; 13, 16) through at least one gate circuit (11, 12) and in which said electronic switches are connected in bridge configuration between an electric current supply and a winding of said feed motor.

6. Apparatus as defined in claim 1 in which discriminator means (7, 8) are provided interposed in the connections (211, 212) between said feedback device (21, 223) and said second set of inputs (63, 64) of said storage register (6), said discriminator means being adapted to supply the said signals representing intervals of movement produced by said feed motor (20) to said last mentioned inputs only when said storage register (6) holds information signals directing an element of movement to be produced by said feed motor (20), and is not receiving information signals from said detector means.

7. Apparatus as defined in claim 6 in which synchronizing means (17, 18) are provided connected (181, 182) with said detector means (4, 5) and said discriminator means (7, 8) and are adapted to enable said first set of inputs (61, 62) and said second set of inputs (63, 64) of said storage register (6) in alternation for admitting signals in turn from said detector means and from said discriminator means.

8. Apparatus as defined in claim 7 which said detector means comprises a first detector circuit (4) adapted to receive pulse signals for one direction of rotation of said feed motor (20) from one output (111) of said numerical control system (1) and a second detector (5) adapted to receive pulse signals for the other direction of rotation of said feed motor (20) from a second output (112) of said numerical control system (1).

9. Apparatus as defined in claim 7 in which said detector means comprises a first detector circuit (4) adapted to respond to pulse signals to be transmitted to said feed motor (2) and a second detector circuit (5) adapted to respond to the desired direction in which said feed motor (20) is to be driven by said pulse signals, and each of said detector circuits is connected to separate outputs (111,112) of said numerical control system (1).

10. Apparatus as defined in claim 7 in which said discriminator means comprises a first discriminator circuit (7) responsive to signals representing intervals of movement produced by said feed motor (20) and a second discriminator circuit (8) responsive to the direction in which said feed motor (20) operates.

11. Apparatus for driving a feed motor in a machine tool control system having a numerical control system and a reversible feed motor operable on continuous direct current and adapted to be driven in either direction under numerical control, which apparatus comprises an electric circuit assembly interposed between said numerical control system and said feed motor comprising:

a storage register (6) having a first set of inputs (61, 62) connected to the outputs (111, 112) of said numerical control system (1) for receiving information signals directing movement to be produced by said feed motor (20) and having also a second set of inputs (63, 64) connected to a feedback device (21, 223) for reception of signals representing intervals of movement produced by said feed motor (20);

buffer storage devices (2, 3) interposed between each output (11, 112) of said numerical control system (1) and inputs (61, 62) of said storage register (6) for temporary storage of information and in which said buffer storage devices are controlled by read out means (19) to provide the next information signals to said detector means (4, 5) only when said logic circuit means (10), in response to the content of said storage register (6) is applying drive to said feed motor (20) in the desired direction;

means including a connection (237, 238) from said feedback device to said numerical control system independently of said storage register (6) for coordinating the succession of information signals from said numerical control system with the succession of movements produced by said feed motor;

means associated with said storage register (6) for subtracting signals of said feedback device (21, 223) from signals of said numerical control system (1), and logic circuit means (10) adapted to apply the drive to said feed motor (20) in forward or reverse direction in accordance with the content of said storage register (6).

12. Apparatus for driving a feed motor in a machine tool control system having a numerical control system and a reversible feed motor operable on continuous direct current and adapted to be driven in either direction under numerical control, which apparatus comprises an electric circuit assembly interposed between said numerical control system and said feed motor comprising:

indicating means (23) having inputs (231, 232, 234, 235) connected to output connections (211, 212) of said feedback device (21, 223) or to said second set of inputs (63, 64) of said storage register (6) and in which said indicator means is adapted to show the actual position of said feed motor (20) and thereby that of the tool or the work piece, or both, over its or their full range of displacement;

means including a connection (237, 238) from said feedback device to said numerical control system independently of said storage register (6) for coordinating the succession of information signals from said numerical control system with the succession of movements produced by said feed motor;

means associated with said storage register (6) for subtracting signals of said feedback device (21, 223) from signals of said numerical control system (1), and logic circuit means (10) adapted to apply the drive to said feed motor (20) in forward or reverse direction in accordance with the content of said storage register (6).

13. Apparatus as defined in claim 12, in which the outputs of said feedback device (21, 223) associated with a first circuit means (4 — 18) connected in parallel to the inputs (211b, 212b, 211c, 212c, 211d, 212d) of at least one calculating means (24, 25) and in which said calculating means is associated also with other circuit means so that the positioning signal for said other circuit means (4 —18) and feed motors (20) are furnished in response to the resulting motion of said first mentioned feed motor in accordance with a predetermined motion program provided in said calculating means (24, 25).

14. Apparatus as defined in claim 12 in which said indicating means (23) includes a differentiating means adapted to indicate the rate of change of the resultant position as an average displacement velocity of the work piece or the tool, or both.

15. Apparatus as defined in claim 14 in which said indicating means (23) of said other circuit means have outputs (236, 239) that are coupled back to said calculating means (24, 25) to modify the operation of the feed motor of same circuit means.

16. Apparatus as defined in claim 12 in which output connection (237, 238) of said indicating means (23) provides the said connection of said feedback device (21, 223) with said numerical control system (1) and thereby provide for processing operations of said system according to a predetermined program or provide control of the said processing operations in response to a signal appearing in said output connection (237, 238).

17. Apparatus for driving feed motors in a machine tool control system having a numerical control system and a reversible feed motor (20) for each of a plurality of coordinate directions of relative motion between tool and work piece and in which said apparatus comrprises, interposed between each of said feed motors and said numerical control system, apparatus comprising an electric circuit assembly which comprises:

a storage register (6) having a first set of inputs (61, 62) connected to the outputs (111, 112) of said numerical control system (1) for receiving information signals directing movement to be produced by said feed motor (20) and having also a second set of inputs (63, 64) connected to a feedback device (21, 223) for reception of signals representing intervals of movement produced by said feed motor (20);

the feed back device (21, 223) of at least one of said interposed circuit assemblies being connected (237,238) to said numerical control system independently of the storage register (6) of said interposed circuit for coordinating the succession of information signals from said numerical control system with the succession of movements of at least one of said feed motors, and said plurality of coordinate directions being sufficient to enable rectilinear and rotational movements to be combined;

means associated with said storage register (6) for subtracting signals of said feedback device (21, 223) from signals of said numerical control system (1), and logic circuit means (10) adapted to apply the drive to said feed motor (20) in forward or reverse direction in accordance with the content of said storage register (6).

18. Apparatus for driving feed motors in a machine tool control system having a numerical control system and a plurality of reversible feed motors operable on continuous direct current and adapted to be driven in either direction under numerical control, which apparatus comprises:

a plurality of electric circuit assemblies each interposed between said numerical control system and one of said feed motors, said circuit assemblies having respective control inputs (111a, 112a, 111b, 112b, 111c, 112c, 111d, 112d) respectively connected with the outputs of the same numerical control system (1) whereby movement of the tool or the work piece or both, is adapted to be controlled simultaneously in more than one direction;

a storage register (6) having a first set of inputs (61, 62) connected to the outputs (111, 112) of said numerical control system (1) for receiving information signals directing movement to be produced by said feed motor (20) and having also a second set of inputs (63,64) connected to a feedback device (21, 223) for reception of signals representing intervals of movement produced by said feed motor (20);

means including a connection (237, 238) from said feedback device to said numerical control system independently of said storage register (6) for coordinating the succession of information signals from said numerical control system with the succession of movements produced by said feed motor;

means associated with said storage register (6) for subtracting signals of said feedback device (21, 223) from signals of said numerical control system (1), and logic circuit means (10) adapted to apply the drive to said feed motor (20) in forward or reverse direction in accordance with the content of said storage register (6).

19. Apparatus as defined in claim 18 in which buffer storage means (2, 3) are provided respectively in each connection between the outputs (111, 112) of said numerical control system (1) and the inputs (111a, 112a, 111b, 1112b, 111c, 112c, 111d, 112d), respectively, of each of said circuit means for the translation of signals from a single numerical control system (1) to each of the feed motors (20) (FIG. 2).

* * * * *